H. G. COLLINS.
TORTILLA MOLDING MACHINE.
APPLICATION FILED MAR. 25, 1907.
1,031,423.
Patented July 2, 1912.
2 SHEETS—SHEET 1.
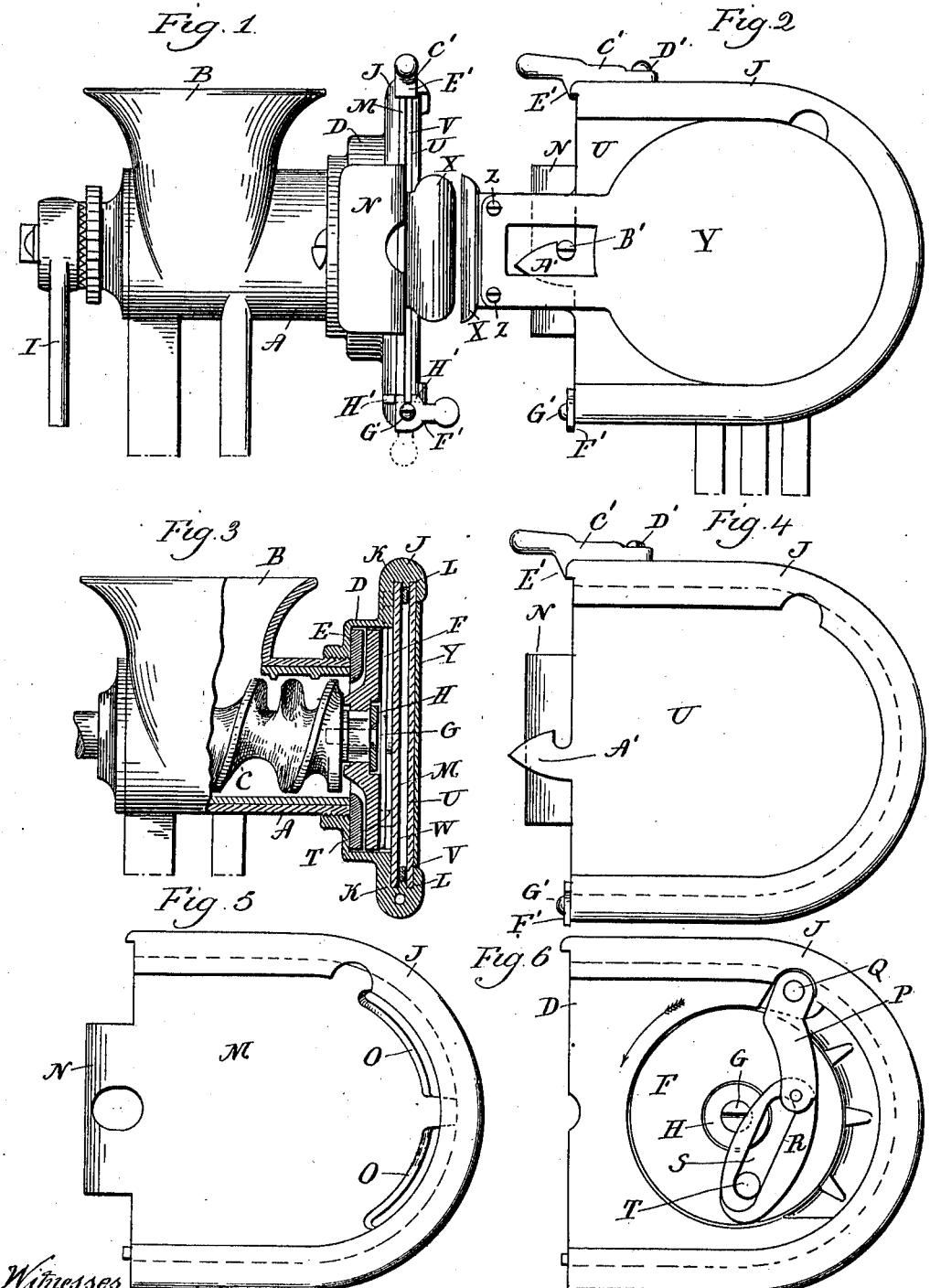
Witnesses
J. K. Beach
M. O. Williams
Herbert G. Collins, Inventor
by Beach & Fisher
his Attys H. G. COLLINS.
TORTILLA MOLDING MACHINE.
APPLICATION FILED MAR. 25, 1907.
1,031,423.
Patented July 2, 1912.
2 SHEETS—SHEET 2.
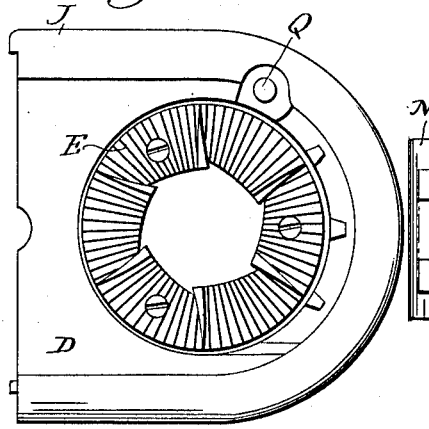
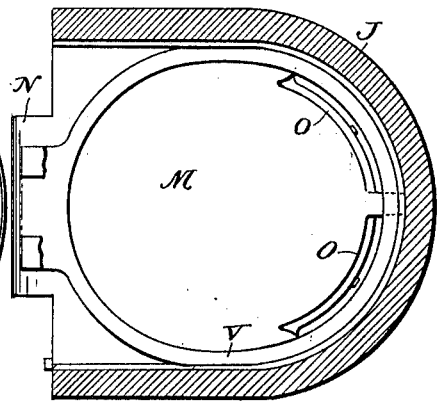
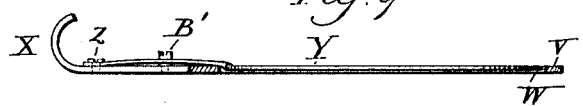
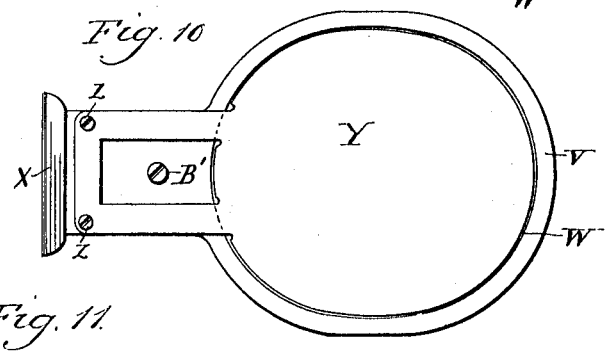
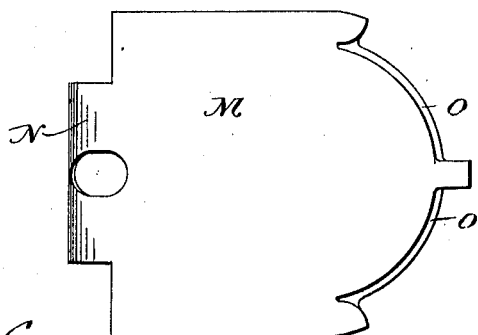
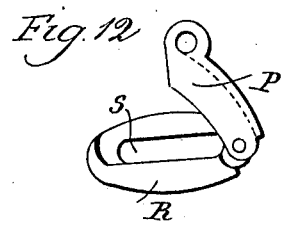

UNITED STATES PATENT OFFICE.

HERBERT G. COLLINS, OF NEW HAVEN, CONNECTICUT, ASSIGNOR TO SARGENT & COMPANY, OF NEW HAVEN, CONNECTICUT, A CORPORATION OF CONNECTICUT.

TORTILLA-MOLDING MACHINE.

1,031,423.  Specification of Letters Patent.  Patented July 2, 1912.

Application filed March 25, 1907. Serial No. 364,311.

*To all whom it may concern:*

Be it known that I, HERBERT G. COLLINS, of the city and county of New Haven and State of Connecticut, have invented new and useful Improvements in Tortilla-Molding Machines, of which the following is a full, clear, and exact description, when taken in connection with the accompanying drawings.

This invention relates to tortilla molding machines, and has for its object the production of a simple and efficient mechanism in which the meal to be used in the tortilla is ground and forced into a mold formed of a hollow disk, which when withdrawn will carry with it the meal in the form desired. To this end, a ring or other attachment is secured to the outlet of a grinding machine which carries a plurality of removable plates. Through an opening, the meal is forced from the grinders between the two plates wherein a disk is adapted to be placed. In the particular form of machine described herein the plates are located in a plane at right angles to the axis of the forcing screw of the grinding machine, and the disk is removable in the plane of the plates.

The invention furthermore consists of a device for forcing the meal from the grinders into the space between the plates, and of such other improvements and combinations of parts set forth and claimed hereinafter.

Referring to the drawings, Figure 1 represents a side elevation of a machine embodying the invention, Fig. 2, an end view of the same, Fig. 3, a longitudinal vertical central section through a portion of the machine, Fig. 4, an end view with the disk removed, Fig. 5, a similar view with one of the plates removed, Fig. 6, a similar view with both plates removed, showing the mechanism for forcing the meal between the plates, Fig. 7, a similar view with the outer grinding disk and forcer removed, Fig. 8, a similar view with the inner plate and disk in place, the outer plate being removed, Fig. 9, a sectional view through the hollow disk, Fig. 10, a front view of the same, Fig. 11, a front view in detail of the inner plate, and Fig. 12, a detail view of the forcer.

In all figures, similar letters of reference represent like parts.

The part designated by the letter A represents a hollow cylindrical casing, with the usual feed opening B at the top thereof. Within the casing A is located a feed screw C of well known construction. To the forward end of the casing is screwed a ring, or similar attachment, which carries a ring E having on its outer surface teeth, which forms the inner grinding plate. A disk F is secured to the outer end of the forcing screw C by means of a screw G and washer H which disk has on its inner surface grinding teeth to coöperate with the grinder E.

Upon the rotation of the feed screw C by means of the handle I, the meal which enters through the opening B is fed forward between the grinders E and F, and out over the periphery of the outer grinding disk F (Figs. 3 and 6). The ring D is provided with a U shaped flange J, having on its inner side two parallel grooves K and L. In the groove K an inner plate M is adapted to slide longitudinally, as shown more particularly in Figs. 3 and 5, in a plane at right angles to the axis of revolution of the grinding plates E and F. This plate is provided at its outer end with a handle N. At the opposite end the plate is cut away at O (Figs. 5 and 11), so that when the plate is in place in the flange J there will remain an opening or openings at the inner end at O (Fig. 5) between the plate and flange J, which forms a passage from the interior of the ring D through which the meal may be forced from the grinding plates E and F. In order that the meal will be forced through the openings O, (which are at one side of the grinding plates E and F) without clogging, forcing mechanism is provided consisting of a lever arm P fulcrumed at Q to the ring D, and at its outer end having a pivotal connection to a link R with the slot S, through which slot projects a stud T on the outside of the grinder F. As the grinder F is rotated in the direction of the arrow (Fig. 6), the link is extended in a substantially straight line with the lever P, and its outer end is carried downward and around the periphery of the grinder F to force the meal passing over the periphery of the plate F toward the openings O in the plate M. When, however, the link has reached the limit of its movement in this direction the stud T will travel upward in the slot S and turn the link on its pivot to a position substantially parallel with the lever P, so that the outer end of the link will be brought near the top of the grinder F to sweep around again as described, forcing the meal downward, to the right (Fig. 6), and out through the openings O in the plate M.

An outer plate U is adapted to slide in the groove L in the flange J (Fig. 3) and when in position a space is left between the two plates M and U. A disk V having a hollow interior W, and at one end a handle X is adapted to slide between the plates M and U, and when in position the farther end of the disk will project beyond the openings O (Fig. 8), so that the openings O will admit meal from the interior of the ring D into the hollow interior W of the disk V when between the plates M and U.

The meal is forced by the forcing device above described into the hollow interior W of the disk V until this internal space is filled, whereupon the disk may be drawn out by the handle X. The hollow interior of the disk being of the desired form of the tortilla the meal which has been packed therein will be of the desired form.

As the disk when drawn out is in a vertical position, a supporting plate Y is attached by screws Z so that when the disk is removed and turned to a horizontal position the plate Y will support the meal within the interior of the disk. When the disk V is in place between the plates M and U, the supporting plate Y lies on the outside of the plate U, as shown more particularly in Figs. 2 and 3. The plate U is provided with a hook A' adapted to engage a stud B' on the disk V to hold the disk in place, while the meal is being ground and forced into the interior of the disk.

The means for locking the plates in position in the flange J may consist of a lever C' pivoted at D', and having two depending pieces E' adapted when the lever is swung to the position shown in Figs. 1 and 2 to engage the outer ends of the plates M and U, and prevent their removal. At the same time the disk V is free to be removed between the pieces E' (Fig. 1).

A further locking device consists of a lever F', pivoted at G' to swing the projections H' in front of the lower edges of the plates M and U (Fig. 1), while the disk V may pass between the projections H'. When the lever F' is turned, however, to the position shown in dotted lines Fig. 1, the plates may be removed.

Having now described my invention, what I claim and desire to secure by Letters Patent is:—

1. In a machine for molding tortillas, or similar articles, the combination with a cylindrical casing; of a ring adapted to be screwed on the forward end of said casing; grinders in said ring; a device for molding said tortillas carried by said ring; and means for forcing the meal from said grinders into said device, substantially as described.

2. In a machine for molding tortillas, or similar articles, the combination with a grinding machine; of a frame having an opening to said grinding machine; a plurality of plates mounted in said frame substantially at right angles to the axis of the grinding machine and having a space between them; and a disk adapted to fit between said plates and having a hollow interior, substantially as described.

3. In a machine for molding tortillas or similar articles, the combination with a frame; of an inner plate adapted to slide in said frame, and when in said frame adapted to leave an opening into the interior thereof; an outer plate also slidable in said frame and adapted to close one side thereof; and a hollow disk slidable longitudinally between said plates and having its interior of the form of the article to be molded, substantially as described.

4. In a machine for molding tortillas or similar articles, the combination with the frame; of a disk having a hollow interior of the dimensions of the article to be molded slidably removable from said frame only in the plane of the disk; and a supporting plate secured to said disk and removable therewith, substantially as described.

5. In a machine for molding tortillas or similar articles, the combination with the frame; of a disk having a hollow interior of the dimensions of the article to be molded adapted to fit vertically in said frame and removable slidably only from said frame; and a supporting plate secured to said disk and removable therewith, substantially as described.

6. In a machine for molding tortillas, or similar articles, the combination with grinding mechanism; of a device for molding the tortilla; and means for forcing the meal or similar substance from said grinding mechanism to said molding device consisting of a jointed lever operable by said grinding mechanism, substantially as described.

7. In a machine for molding tortillas, or similar articles, the combination with grinding mechanism; of a frame; plates mounted in said frame having a space between them and mechanism for forcing meal or similar substance from said grinding mechanism into said space movable in a plane at right angles to the axis of said grinding mechanism, substantially as described.

8. In a machine for molding tortillas, or similar articles, the combination with a casing; of a grinding disk; a device for molding the tortilla, and a forcing lever pivoted to said casing and operated by said disk, substantially as described.

9. In a machine for molding tortillas, or similar articles, the combination with a casing; of a grinding disk; a device for molding the tortilla; and mechanism for forcing the meal or similar substance from the periphery of said disk into said molding device at one side of said disk, substantially as described.

In witness whereof, I have hereunto set my hand on the 21st day of March, 1907.

HERBERT G. COLLINS.

Witnesses:
SAMUEL R. MUNSON,
ROBERT MACARTHUR, Jr.

Copies of this patent may be obtained for five cents each, by addressing the "Commissioner of Patents, Washington, D. C."